March 10, 1936. J. H. DICKERSON 2,033,690
METHOD OF AND APPARATUS FOR SEPARATING COMPOSITE MATERIAL INTO ITS COMPONENTS
Filed April 24, 1935  3 Sheets-Sheet 1
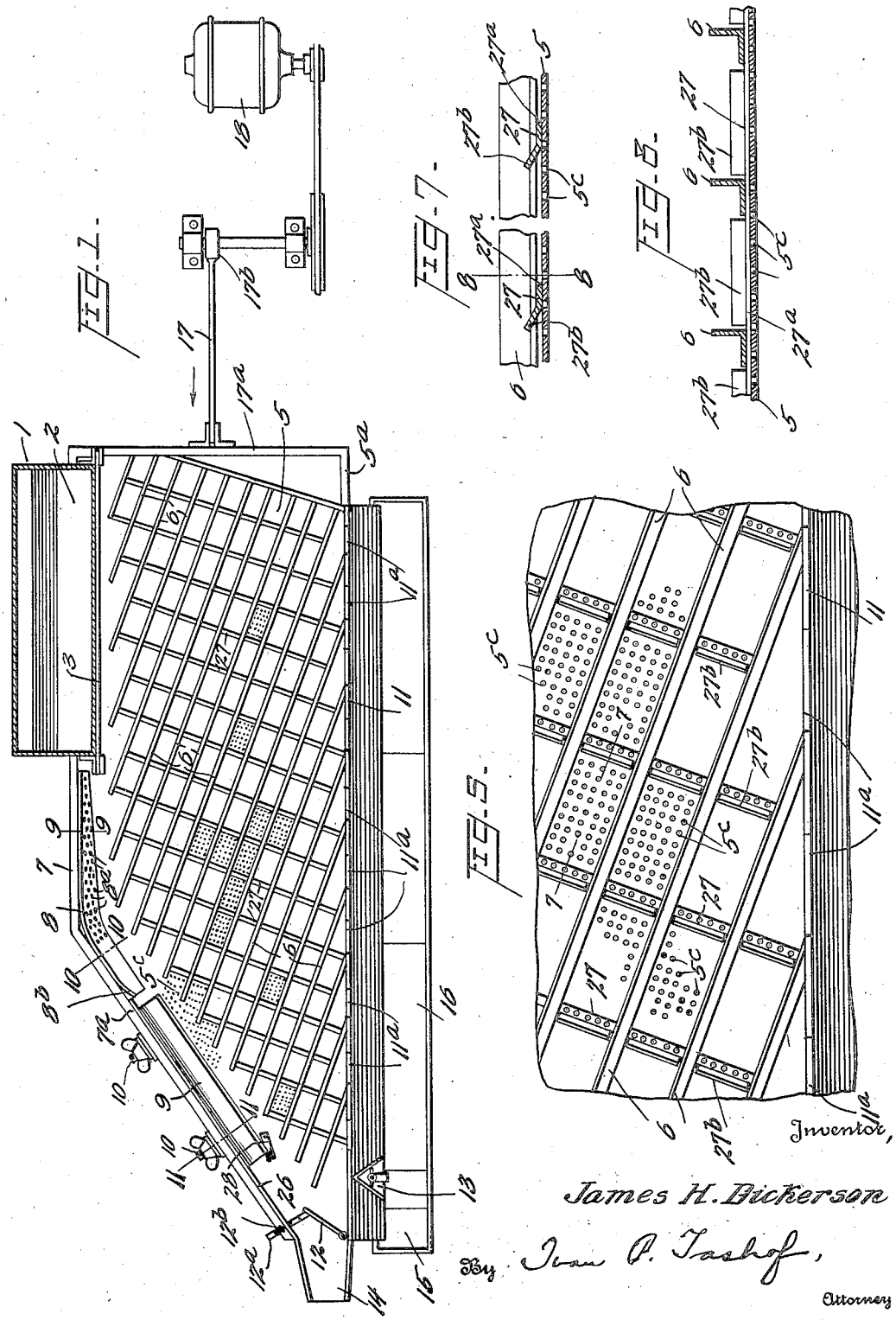

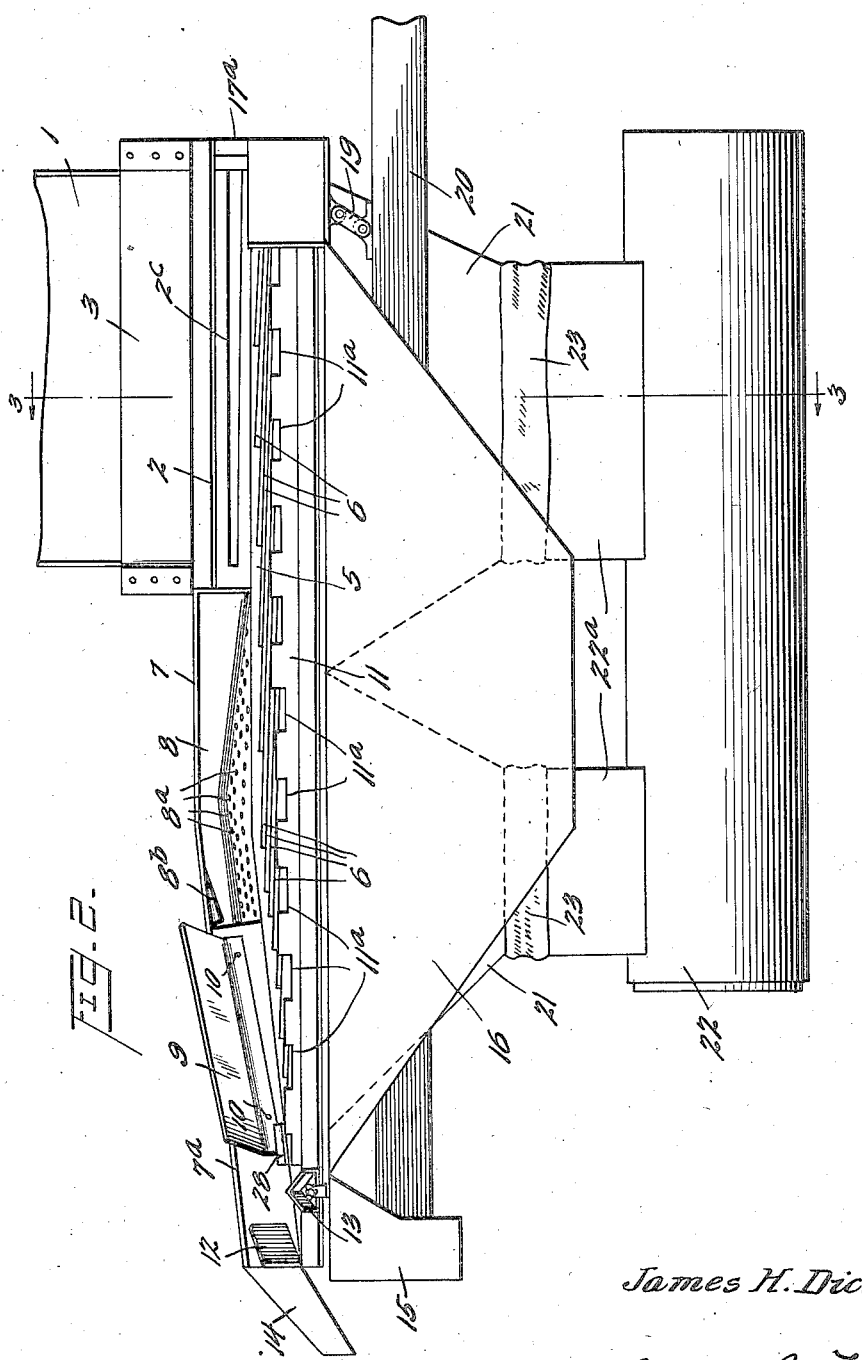

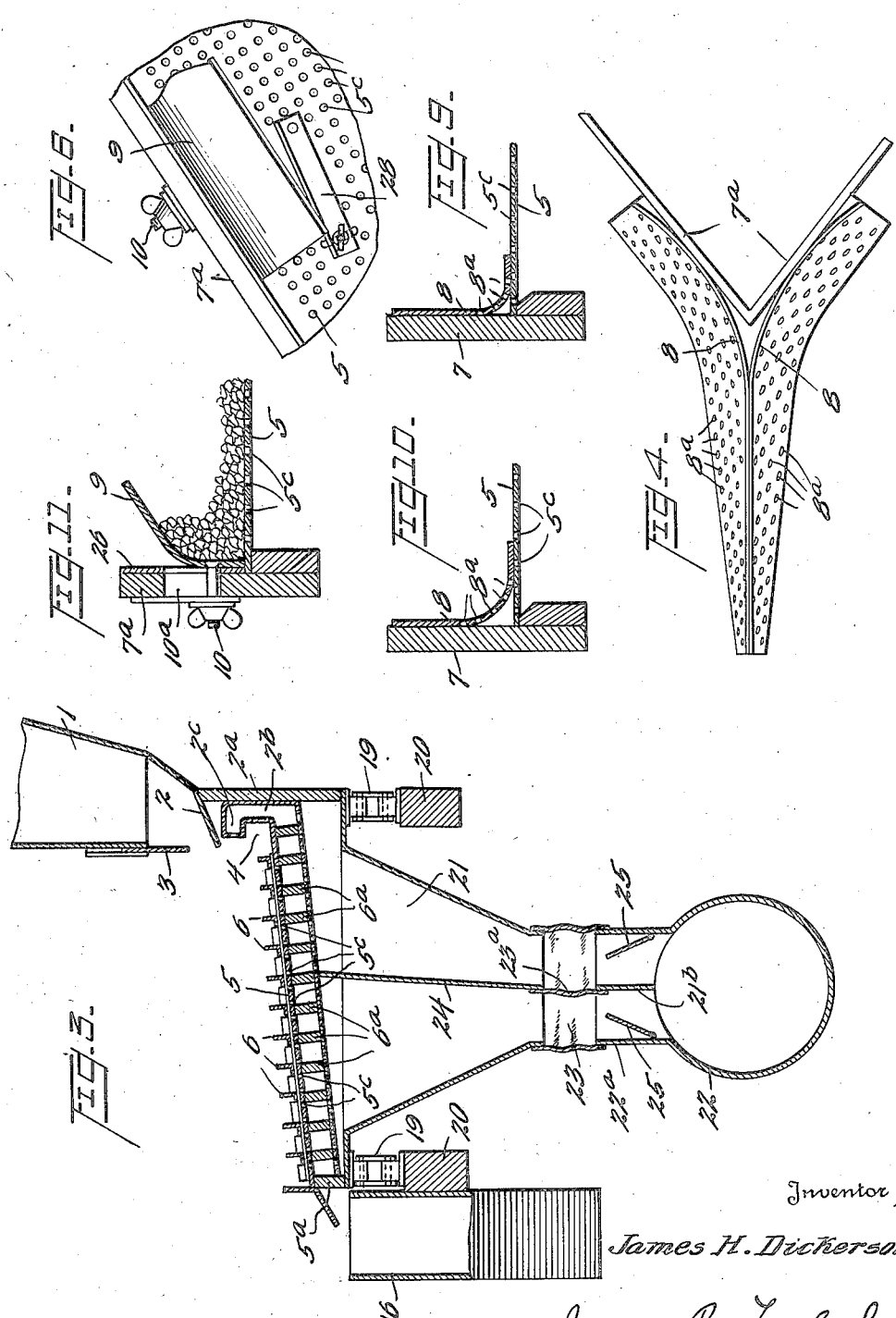

Patented Mar. 10, 1936

2,033,690

UNITED STATES PATENT OFFICE 2,033,690

METHOD OF AND APPARATUS FOR SEPARATING COMPOSITE MATERIAL INTO ITS COMPONENTS

James H. Dickerson, New Philadelphia, Ohio

Application April 24, 1935, Serial No. 18,029

16 Claims. (Cl. 209—467)

This invention relates to pneumatic separators and has special reference to separator for separating granular or lump material of heavy gravity from granular or lump material of light gravity, such as slate and other refuse, from coal.

More particularly, the invention relates to a separator of the type shown in my copending application for patent on a Coal cleaner, filed September 1, 1933 and bearing the Serial Number 687,770, this application being a continuation-in-part thereof.

It will be noted that the type of separator referred to has a reciprocating and rocking deck having perforations therein for the passage of a gas such as air and provided with riffles over which the lighter material flows, the lighter material traversing the deck in one general direction while the heavier material traverses the deck in a second general direction to deliver away from the delivery of the first direction.

Furthermore, the invention relates to both an improved method of effecting such separation and an apparatus for carrying the method into effect.

One important object of the invention is to provide, in such a separator, an improved construction whereby to gather the heavier material or refuse into a stream and to spread this stream during its travel toward the discharge for such stream so that the entrapped pieces of lighter material, such as coal, will be released.

A second important object of the invention is to provide, in such a separator, an improved construction by which the said stream of heavier material or refuse is concentrated after being spread, the concentration being effected without obstructing the flow of the stream.

A third important object of the invention is to provide a separator having novel means whereby the stream of heavier material or refuse is turned over as it flows along so as to bring the lighter material to the upper surface and thereby to permit the ready separation from the remainder of the stream.

A fourth important object of the invention is to provide a separator having novel means for restricting the discharge of the stream of heavier material or refuse whereby the discharge is kept substantially uniform in conformity with the fluctuations in the amount of heavier material or refuse.

A fifth important object of the invention is to provide novel means in a separator for preventing the heavier material from slipping backwards as it is carried forward under the reciprocating action of the deck.

A sixth important object of the invention is to provide an improved spillway for the deck of such a separator, the spillway being so arranged as to effect the rapid discharge of the cleanest light material, the effect being accomplished by slots or notches in the spillway in advance of the respective riffles, and the material flowing laterally of the spillway to these slots or notches whereby to effect an easy separation of light from heavy material at the lower ends of the riffles.

A seventh important object of the invention is to provide a novel method of separating heavier granular or lump material from lighter granular or lump material.

With the above and other objects in view, the invention consists of certain novel details of construction and combination of parts, and of a novel method hereinafter fully described, illustrated in the accompanying drawings and specifically claimed.

In the accompanying drawings, like characters of reference indicate like parts in the several views, and:

Figure 1 is a plan view of a separator constructed in accordance with this invention;

Figure 2 is a side elevation thereof with the driving means omitted;

Figure 3 is a section on the line 3—3 of Figure 2;

Figure 4 is a plan view of a portion of a separator having a double deck, the view showing the spreader for the heavier material or refuse;

Figure 5 is an enlarged plan view of a portion of the lower or delivery side of the deck;

Figure 6 is a still more enlarged plan view of a portion of the deck showing the discharge end of the concentrator and a guide associated therewith;

Figure 7 is an enlarged section of Figure 5 on the line 7—7 thereof;

Figure 8 is a section on the line 8—8 of Figure 7;

Figure 9 is an enlarged section on the line 9—9 of Figure 1;

Figure 10 is an enlarged section on the line 10—10 of Figure 1;

Figure 11 is an enlarged section on the line 11—11 of Figure 1.

In the embodiment of the invention as herein disclosed, there is provided a storage bin 1 for the mixed heavier and lighter materials, such as raw coal. At the lower end of the bin 1, there is provided a transversely inclined plate 2 which is carried by the reciprocating frame member 2a. An adjustable gate 3 is mounted on the bin 1 to cooperate with the feeder plate 2 and regulate the discharge from the bin in accordance with the height of the opening between the plate 2 and gate 3. The plate 2 delivers the mixed materials to an inclined deck 5 at its upper edge portion and overhangs this upper edge portion. The deck 5 is supported by a frame, the rear member of which is formed by the member 2a, while the front member is shown at 5a. In the cove or recess formed by the overhang of the plate 2, there is provided an upstanding air duct 2b terminating in an upwardly inclined delivery nozzle 2c, which extends along beneath the edge of the plate 2. By the provision of this blower nozzle much of the lighter material, such as coal, is blown out of the stream descending from the plate, while the heavier material, such as slate, drops onto the upper edge portion of the deck and finds its way into the channel 4 formed by the deck and the air duct and nozzle. Riffles 6 extend from the upper and forward portions of the deck 5 rearwardly and downwardly along the deck, these riffles terminating upwardly and forwardly of the deck to leave a clear space therealong forming a species of channel for the heavier material. These riffles are of less height adjacent the nozzle 2c than are those at the lower edge of the deck.

The member 2a is continued forwardly of the bin 1 as at 7. The forward end of the deck terminates in an inclined edge extending forwardly at an angle across the front of the deck and carrying a guard member 7a which is thus at an obtuse angle with the member 7. These members 7 and 7a form a banking bar. Supported by the deck 5, the member 7 and the rear part of the member 7a, is a transversely curved spreader plate 8 arranged with its concave side facing the riffles 6. This plate is pervious to streams of fluid, such as air, being provided with holes 8a for that purpose. Furthermore, the plate 8 has the upper edge of its forward end provided with a downwardly inclined lip 8b overhanging its concave side. This spreader plate 8 has its lower part flush with the deck and has its receiving end very narrow and inclined slightly upward from the deck. The plate increases in height and width to the end of the member 7 and then it curves horizontally to its discharge end. Forward of the spreader plate 8 is a concentrator plate 9. This plate is transversely curved to provide a vertical leg which extends along the member 7a and an inclined leg which overhangs the forward end portion of the deck 5. This concentrator plate is arranged for adjustment in height by adjusting bolts 10 passing through slots 10a in the member 7a. The plate 9 is inclined downwardly from the end adjacent the plate 8 to its delivery end.

The spaces between the lower or delivery ends of the riffles 6 are partially closed by a spillway member 11 which extends along the lower edge of the deck and is provided in its upper edge with spaced notches 11a which lie adjacent the lower faces of said riffles. The forward end of the member 7a is spaced from the forward end of the member 5a to provide a delivery channel for the escape of the heavier material or refuse from the deck. An adjustable gate 12 is pivoted at the forward end of the member 5a and the purpose of this gate is to divide the heavier material, fully separated from the mixture of heavy and light materials, from the middlings or that part of the material which still retains some of the lighter constituent mixed with or attached to the heavier material. A delivery spout 14 extends from the opening between the members 5a and 7a. This gate is held in adjusted position by a bar 12a and pin 12b.

A divider 13 is movably mounted adjacent the gate 12 at the lower edge of the deck to divide the middlings from the lighter material, the former flowing into a middlings hopper 15, while the latter flows into a hopper 16 which may be termed the clean material hopper.

As a means of reciprocating the deck, there is shown a connecting rod 17 attached to an end frame member 17a of the deck, this rod being actuated by an eccentric 17b driven by a motor 18. To permit the deck to oscillate links 19 are provided, these links being pivotally connected at their upper ends to the deck, at their lower ends to fixed sills or beams 20, forming the support for the device. Beneath the riffles 6 and the deck 5 are partitions 6a, which are aligned with the respective riffles to form a grating at the upper ends of the air chests 21, which receive air from the supply pipe 22. Flexible connections 23 connect the chests 21 to branches 22a of the pipe 22, so as to permit free movement of the deck. Each of the branches 22a is provided with a fixed partition 21b and a flexible connection 23a to a fixed partition 24 within the air chest which terminates against the members 6a so as to cause desired distribution of the air. Moreover, gates 25 are provided in each branch 22a and these gates are adjustable so that the air from the pipe 22 may be fed to the deck on one side, and the other of the partition 24 in such manner as to provide a desired adjustable distribution of the air volume.

In order to prevent wear of the member 7a where it might be exposed below the condenser plate 9, there is preferably provided a wear plate 26 which covers the inner face of said member 7a.

The deck is made pervious to the air from the pipe 22 by means of a multiplicity of vents 5c. At intervals between each adjacent pair of riffles, stops are provided which extend from one riffle to the next, and each of these stops consists of a strip having a rear portion 27, which lies flat on the deck and has its rear end bevelled as at 27a. The forward edge portion 27b of each of these stops is inclined upwardly and extends forwardly, as best seen in Figure 7.

A short guide 28 is mounted on the deck 5 at the lower end of the plate 9 and is inclined so that its forward end is closer to the banking bar 7a than its rear end. In connection with the concentrator plate 9, this guide 28 somewhat retards the movement of the heavier material or refuse so as to maintain a substantially uniform width of the stream leaving the concentrator along the banking bar independently of temporary changes in the quantity of heavier material or refuse in the mixture or raw coal.

The operation of the separator will now be described, using coal and refuse as examples of material to be separated, although the device may be utilized for separating many other mixtures of lump or granular material, wherein a lighter material is to be separated from a heavier material. In the present explanation, clean coal will represent the lighter material, and the refuse from the uncleaned or raw coal will represent the heavier material.

The motor is started and this imparts to the deck and the parts carried thereby an oscillatory motion. The gate 3 is adjusted so that a thin sheet of mixed coal and refuse will flow from the bin 1 in front of the nozzle 2c. The gates 23 are adjusted to provide for a suitable flow of air in the lower and upper parts of the deck and through the nozzle 2c. The air issuing through the nozzle blows through the descending sheet of raw coal and the coal and refuse are partially separated at this place, much of the coal being blown out onto the riffle provided portion of the deck, while the refuse with the remainder of the coal drops into the channel 4 or is guided into it by the riffles 6 along which it is forced by the reciprocating action of the deck along the line of the arrow shown in Fig. 1. While the coal is lifted over the riffles by the upward current of air and carried away from the heavier gravity material some of it will be trapped and carried along with the refuse stream, although this will be greatly reduced by the special feed arrangement which gives a free passageway for the refuse stream after it crosses the thin raw feed stream. With each reciprocating stroke the refuse in the channel 4 is advanced by its inertia forwardly on the deck 5 and gradually passes into the concave side of the spreader 8 where it is spread out so coal which may have been trapped with the refuse is brought to the top by the action of the deck and the upward current of air blown through the openings 8a. The coal being relatively light will not have the inertia of the refuse. This difference together with the lifting current of air and gravity will assist the movement of the coal back to the riffled part of the deck 5. Meanwhile the partly cleaned coal is spread out over the riffles 6 in a comparatively thin bed. The heavier gravity material drops out of this bed, which has a fluid like consistency due to the upward current of air through the vents 5c, and goes to the bottom of the deck between the riffles. This material being too heavy to be held up by the air is trapped by the riffles 6 and guided forwardly by them due to the inertia of the material and the reciprocating motion of the deck until it passes from the upper end of the riffles 6 to join the flowing stream of refuse along the top of the deck 5 and the banking bar 7a, while the lighter coal flows down and over the riffles 6 and finally passes out over the notched spillway member 11. This provides a high place next to the upper side of each riffle at its lower end and a notch 11a ahead of it. There may be some slate above each riffle 6 next to the spillway but the coal which passes over the riffles 6 at this point should be clean. The slot in the spillway member 11 causes the material to flow more rapidly below the riffle 6 and sideways to this depression 11a leaving a thinner stream over the high part of the spillway so there will be an easier separation of coal from refuse above the riffle 6 at its lower end. There may be several sections in the length of this spillway member, each section having the tops and bottoms of the slots uniform and those of the forward section being the lower.

The forward movement of refuse along the riffles 6 is assisted by the special stops 27b which keep it from slipping backwards. The inclination of these stops and the fact that their rear edges 27a are bevelled make it easy for the refuse to travel over them as it is propelled forward by reciprocating strokes in the direction of the arrow. The upflowing air from the vents 5c also assist in lifting the refuse over the inclined stops, and if desired the concave part may have holes in it so air may pass through them from the vents 5c to further assist the refuse to pass over the stops. Having passed over a stop there is a positive protection 27b to keep the refuse from slipping back.

As the refuse stream flows along the banking bar 7a after passing from the spreader 8, it moves along the concentrator plate 9 where it is concentrated into a relatively compact stream which tends to rise up on the banking bar 7a but is limited in doing so by the overhang of the plate 9. The plate acts to roll the upper part of the stream away from the banking bar 7a as the stream moves along, so that the material of the stream as it passes along the concentrator 9 tends to turn in a spiral path, and any coal left in the refuse stream will be brought to the surface where it can work out of the refuse stream. The action of the deck 5 will cause the heavier refuse to mass against the banking bar 7a or concentrator plate 9, and this action together with the upward current of air through the deck and gravity will all assist coal in its movement out of the refuse stream.

As with other separators of this type the ends of the riffles 6 are tapered, and this allows middlings, which are mostly coal with refuse attached, to be lifted over the riffles 6 while the heavier gravity material goes to the refuse stream ahead. The middlings then pass from riffle to riffle in a line parallel and close to the refuse stream. The outer edge of the refuse stream away from the banking bar 7a is the lighter part of the refuse and is usually mixed with the middlings. It is usual to have some form of cutting finger or gate such as 13 to separate middlings from the clean coal if it is desired to collect these three products separately. If the amount of refuse changes, the gate 12 must be adjusted or some of the refuse or middlings will go to the wrong discharge point. By lowering the concentrator 9 at its discharge end and the use of the bar 28 the refuse stream is held back a little when there is a temporary increase in the amount of refuse, and let out as it decreases so there is a more uniform discharge and less occasion to adjust the gate to keep refuse from going out with the middlings, or coal to be lost with the refuse. The refuse passes out the spout 14, while the middlings go to the hopper 15, and clean coal to the hopper 16. Middlings may be thrown away with the refuse, remixed with the coal, or retreated before or after crushing.

It will be observed that under the method here employed there is a primary separation whereby most of the heavier material with some of the lighter material is quickly separated from the rest to leave a remainder of partly cleaned coal. This remainder is spread out over the deck 5 in a thin bed where the remaining refuse is taken out and propelled forwardly along riffles to unite with the heavier material on its way to its point of discharge, while the substantially clean coal is discharged over a spillway 11 at the lower edge of the table. The main stream of heavier material is fed forward over a pervious inclined spreader plate 8 where it is subject to upward currents of air to remove coal entrapped with the refuse. The remainder of the heavy gravity material is simultaneously moved forward in a rotating stream and concentrated whereby any free coal left will generally be worked out of the refuse stream, and finally a split is made between the refuse stream and the stream of middlings moving parallel and close thereto. The split may be made to throw the lighter part of the refuse stream with the middlings or part of the middlings with the refuse.

There has thus been provided a simple and efficient device of the kind described and for the purpose specified. There has also been provided an efficient and economical method for separating entrained lighter material from a mass containing a relatively small quantity of light material mixed with a relatively large quantity of heavy material, and it is to be noted that this method may be carried into execution by any suitable means.

It is obvious that changes may be made in the apparatus and method herein set forth without departing from the material principles of the invention. It is, therefore, to be understood that the invention includes any apparatus and method which comes within the scope of the appended claims.

Having described my invention and set forth its merits what I claim and desire to secure by Letters Patent is:—

1. A dry separating apparatus having a pervious reciprocating deck provided with diagonal riffles, said deck having an upper side and a banking bar along which a refuse stream is propelled forward, and means along the banking bar for spreading said refuse stream, said means consisting of a narrow pervious plate adjacent the deck bottom, said plate having a receiving and a discharge end, the receiving end being very narrow and inclined upwardly from said deck, said plate increasing in width and height with a vertical curve to a point forward from which it curves horizontally and vertically to its discharge end along the banking bar.

2. In a dry separating apparatus having a pervious reciprocating deck, with a central portion and a banking bar along which a refuse stream is propelled forwardly, means for spreading said refuse stream to release entrapped pieces of coal, said means consisting of a narrow double plate adjacent the central portion of the deck bottom, said plate having one receiving and two discharge ends, said receiving end being very narrow and inclined upwardly, said plate increasing gradually in width and height with curves vertically upwards to its center to a point from which it curves horizontally and vertically in two directions to its discharge ends along the banking bar.

3. A dry separating apparatus having a pervious inclined reciprocating deck provided with diagonal riffles, and a spillway member over which clean coal is discharged, said spillway member being a notched bar having its high parts along the lower end of each riffle on the side which carries refuse, and the depressed parts next to the other side of each riffle, the spillway member having several sections in its length, each section having a uniform top with depressions, and the several sections being made successively lower towards the forward part of the deck.

4. A dry separating apparatus with a pervious inclined reciprocating deck provided with riffles set diagonally, and having a banking bar and a passageway for refuse ahead of the riffles, in combination with a pervious curved spreader plate and an adjustable concentrating member having a curved and an upwardly inwardly inclined portion, said spreader and concentrating members being attached to the banking bar, first spreading and then concentrating the refuse stream.

5. A dry separating apparatus having in combination a deck with a pervious floor provided with diagonal riffles, means for feeding raw material to said deck and reciprocating the deck to propel the material in a predetermined direction, said deck being sloped transversely to its imparted direction of reciprocation with a slight additional rise forward along the top of the deck, a banking bar at the forward end of the deck and provided with a spreader plate and a concentrating member to clean and control the refuse stream, carrying it first with and then at an angle to the imparted direction of reciprocation, thin bars with an upturned edge between the riffles to keep slate from slipping backwards, a notched spillway member along the delivery side of the deck, means for separating the resultants and collecting the products and means for supplying air and controlling its upward passage to different parts of the deck.

6. A dry separating apparatus having in combination a deck with two sides and a pervious floor provided with diagonal riffles, means for feeding a thin longitudinal stream of raw material along the upper side of said deck so that it drops to the deck, said deck having a passageway provided behind said feed stream for the free forward movement of refuse, means for reciprocating the deck and propelling the material in a predetermined direction, means for providing a continuous current of air and controlling its upward passage to different parts of the deck, said deck being sloped transversely from the feed to the discharge side with a slight additional rise forward along the upper side to increase the side pitch, a banking bar along the front of the deck and supporting a pervious spreader plate and an adjustable concentrating member to clean and control the movement of the refuse stream which is carried first with and then at an angle to the imparted line of travel, means for separating the resultant material into a plurality of products, thin bars with an upturned edge between the riffles to keep slate from slipping backward, and a notched spillway member along the lower side of the deck and over which the clean coal is discharged.

7. In a separator for separating heavier from lighter material, an inclined deck having an upper edge and a forward edge extending at an obtuse angle to the upper edge, a banking bar extending along said edges, a pervious spreader plate extending along the forward part of the upper edge of the deck and along the upper part of the forward end of said deck, a concentrator plate extending from the spreader plate along the forward part of the banking bar and adjustable vertically at each end on said bar, said concentrating plate being provided with means for causing rotation of the stream transversely of the direction of movement of the stream to bring the lighter constituent of the mixture to the surface thereof to thereby free the lighter constituent from the refuse, and means to secure the concentrator plate in adjusted position.

8. In a separator for separating heavier from lighter material, an inclined deck having an upper edge and a forward edge extending at an obtuse angle to the upper edge, a banking bar extending along said edges, a pervious spreader plate extending along the forward part of the upper edge of the deck and along the upper part of the forward end of said deck, a concentrator plate extending from the spreader plate along the forward part of the banking bar and adjustable vertically at each end of said bar, said concentrating plate being provided with means for causing rotation of the stream transversely of the direction of movement of the stream to bring the lighter constituent of the mixture to the surface thereof to thereby free the lighter constituent from the refuse, means to secure the concentrator plate in adjusted position, and means to divide the stream of material issuing from the concentrator plate, from the stream of middlings flowing alongside of the refuse stream.

9. A dry separating apparatus having a pervious reciprocating deck provided with diagonal riffles, said deck having an upper side, and a banking bar along which a refuse stream is propelled forwardly, said banking bar extending at an angle to the direction of reciprocation of the deck, means for spreading said refuse stream, said means consisting of a narrow pervious plate adjacent the deck bottom, said plate having a receiving and a discharge end, the receiving end being narrow and curving upwardly from the deck, said plate increasing in width and height to a point forwardly from which it curves horizontally and vertically to its discharge end along the banking bar, and a concentrating plate positioned along a portion of the length of the banking bar and receiving the refuse stream discharged from said spreader, said concentrating plate having a curved and upwardly inclined portion directed away from the banking bar and over the deck.

10. A dry separating apparatus having a pervious inclined reciprocating deck and a banking bar having a rear portion extending substantially parallel to the direction of reciprocation of the deck and a forward portion at an angle to the direction of reciprocation of the deck and along the discharge end of the separator, a pervious curved spreader plate positioned closely adjacent to the rear portion of the banking bar and adapted to receive a stream of components consisting largely of refuse, a concentrating plate extending along the forward portion of said banking bar, means for moving the refuse stream of settled material, the heavy refuse material predominating, first, to the spreader plate, and then to the concentrating plate, said concentrating plate being provided with means for causing rotation of the stream transversely of the direction of movement of the stream to bring the lighter constituent of the mixture to the surface thereof and thereby free the lighter constituent from the refuse.

11. A dry separating apparatus having an inclined pervious reciprocating deck provided with diagonal riffles, and a banking bar at the upper side of the deck along which a refuse stream is propelled forwardly above the upper ends of said riffles, said banking bar extending at an angle to the direction of reciprocation of the deck, pervious means along the banking bar for spreading said refuse stream, and a concentrating means positioned along the banking bar and beyond the spreading means for receiving the refuse stream discharged from said spreading means, said concentrating means including means for directing the refuse stream transversely away from the banking bar and over the deck.

12. A dry separating apparatus having an inclined pervious reciprocating deck provided with diagonal riffles, and a banking bar at the upper side of the deck along which a refuse stream is propelled forwardly by said riffles, said banking bar extending at an angle to the direction of reciprocation of the deck, means along the banking bar for spreading said refuse stream, said means consisting of a narrow pervious plate adjacent the deck bottom and curving upwardly therefrom, said plate increasing in width and height above the deck from its receiving end to its discharge end, and a concentrating plate positioned beyond the spreading means for receiving the refuse stream discharged from said spreading means, said concentrating plate directing the refuse stream transversely away from the banking bar and over the deck.

13. A dry separating apparatus having an inclined pervious reciprocating deck provided with diagonal riffles, and a banking bar at the upper side of the deck along which a refuse stream is propelled forwardly, said banking bar extending at an angle to the direction of reciprocation of the deck, pervious means along the banking bar for spreading said refuse stream, and a concentrating plate positioned beyond the spreading means for receiving the refuse stream discharged from said spreading means, said concentrating plate having a curved upwardly inclined portion directed away from the banking bar and over the deck to cause said refuse stream to be directed away from the bankink bar and over the deck.

14. A pervious spreader plate adapted for use in connection with a banking bar of a riffled concentrator, said spreader plate having a receiving end and a discharge end, the receiving end being narrower than the discharge end, said plate being curved transversely and longitudinally, the discharge end having an inclined portion for deflecting inwardly the upper portion of the stream received thereby.

15. The method of separating a stream of material having heavy and light constituents, comprising progressing said material in a transversely inclined bed, reciprocating the bed longitudinally, passing upwardly directed air currents therethrough, directing the heavier constituents in the lower stratum of the bed together with some of the light constituents toward the upper side of the bed, banking said mixture of heavy and light constituents along said upper side, spreading said banked portion in a thin transversely raised stream, and then deflecting said raised portion rearwardly and downwardly over the bed towards the lower edge thereof to bring the light constituents of the mixture to the surface thereof, and thereby free the light constituents from the heavy constituents.

16. The method of separating raw material having heavy and light constituents, comprising feeding the material in a thin freely flowing stream upon a reciprocating support, effecting a partial separation in the stream by directing a current of air to the stream to cause the lighter constituents to be directed out of the feed stream and form a bed on the reciprocating support, while some of the heavy constituents fall on the support behind the stream to form a heavy constituent lane, progressing the heavy constituent lane along the upper side of the reciprocating support, directing the heavy constitutents in the lower stratum of the bed while being subjected to upwardly directed air currents, towards the upper side of the bed to join the material of the heavy constituent lane said mixture containing some light constituents, banking said mixture of heavy and light constituents along said upper side, spreading said banked portion in a thin transversely raised stream and then deflecting said raised portion rearwardly and downwardly over the bed towards the rear lower edge thereof to bring the light constituents of the mixture to the surface thereof and thereby free the light constituents from the heavy constituents.

JAMES H. DICKERSON.